Figure 1:
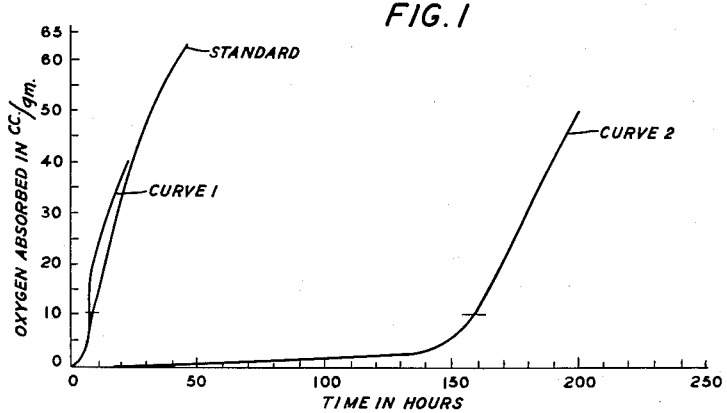

INVENTORS W. L. HAWKINS
V. L. LANZA
F. H. WINSLOW

United States Patent Office 2,967,848
Patented Jan. 10, 1961

2,967,848

ALPHA-OLEFIN HYDROCARBONS STABILIZED WITH CARBON BLACK AND A COMPOUND HAVING R(SH)$_x$ STRUCTURE

Walter L. Hawkins, Montclair, Vincent L. Lanza, Summit, and Field H. Winslow, Springdale, N.J., assignors to Bell Telephone Laboratories, Incorporated, New York, N.Y., a corporation of New York Filed Nov. 29, 1956, Ser. No. 625,109

7 Claims. (Cl. 260—41)

This invention relates to the stabilization of essentially saturated hydrocarbon polymers against deterioration due both to thermal oxidation and oxidation accelerated by the absorption of ultraviolet emission and to products so stabilized. More specifically the invention is directed to the stabilization of the class of essentially saturated hydrocarbon polymers containing tertiary hydrogen atoms, this class including both those polymers in which the tertiary hydrogen occurs at definite intervals by reason of the chemical nature of the monomer and those in which the tertiary hydrogen atom occurs in random fashion, such for example as in polyethylene.

In accordance with this invention protection against the degradative influences set forth above is afforded by incorporation into the polymer of small amounts of any retarder material selected from a new group of antioxidant compounds described herein together with dispersed particles of carbon.

Essentially saturated hydrocarbon polymers containing tertiary hydrogen atoms which are effectively stabilized against both deterioration resulting from ultra-violet oxidation and thermal oxidation by a combination of carbon black and the retarders reported herein include such materials as polymers of ethylene, propylene, butene-1, 3-methyl pentene-1, dodecene-1, 4,4 dimethyl pentene-1, 3-methyl butene-1, 4-methyl pentene-1 and copolymers and mixtures including any one of these polymers.

Polymeric materials stabilized in accordance with this invention include those containing as few as one tertiary hydrogen atom to every hundred carbon atoms and those containing as many as one tertiary hydrogen atom to every hundred carbon atoms. For a discussion of the oxidative mechanism common to such materials, see "Modern Plastics," volume 31, pages 121-124, September 1953.

Some of the materials listed above have already attained considerable commercial importance, notably polyethylene, while some of the other materials have excellent electrical and mechanical properties and will doubtless find widespread use in the near future.

Many of the most important applications of polyethylene such as its use in cable sheathings, depend on its very good mechanical properties such as high tensile strength and abrasion resistance coupled with its repellent properties against water and water vapor. Other uses take advantage of its high dielectric strength in applications such as primary insulation of wire conductors.

Unfortunately, however, polymeric materials such as polyethylene and others listed are subject to deterioration from sunlight and heat both of which induce oxidation of the long chain polymeric structure and thereby impair tensile strength, low temperature brittleness and dielectric properties. Oxidative deterioration occurring independently of ultraviolet light is here referred to as "thermal oxidation" and as the term implies, the effect is substantially accelerated by an increase in temperature.

It was discovered some time ago by workers in the field that oxidation occurring under the influence of ultra-violet emission could be effectively avoided by the incorporation into the polymer of small amounts of finely dispersed particles of carbon black. Effective light shielding from ultraviolet emission is afforded by the incorporation into the polymer of from about .05 percent to about 5 percent by weight, and usually about 3 percent, of carbon black particles of the order of somewhat less than 1000 Angstroms in size. Many types of carbon black are commercially available for this purpose and their use is widespread. Any such materials are effective in combination with the retarders of this invention in producing a stabilized polymeric product.

The deleterious degradative effect of thermal oxidation on polymers such as polyethylene and polypropylene has also received considerable attention by researchers in the field. Effective "antioxidants" developed for this purpose are generally secondary amines of aromatic compounds which may, in addition to the amino grouping, contain, as an additional ring substituent, a branched or normal aliphatic radical generally containing three or more carbon atoms. As is well known, a general requirement of such antioxidants is that they contain an antioxidant group such as the secondary amino group attached to an aromatic ring, the compound having such a structure that its resulting radical is stabilized by resonance energy. Much consideration has been given such antioxidants in the texts, see, for example, G. W. Wheland's "Advanced Organic Chemistry," 2nd edition, chapters 9 and 10.

However, even though it has been known for some time that ultraviolet degradation may be effectively prevented by the use of a dispersion of carbon black particles, and even though thermal oxidative degradation may be avoided by the use of any of several antioxidants commercially available for this purpose, a further difficulty has been encountered in attempts to prepare polymeric compositions which are at the same time stabilized against both influences. In view of the knowledge that certain carbon blacks when incorporated into essentially saturated hydrocarbon polymers containing tertiary hydrogen atoms have a mild antioxidant effect in addition to shielding the substance against ultraviolet radiation, it was expected that the incorporation of known antioxidants into polymeric materials containing such carbon blacks would result in further increasing stability against thermal oxidation. It was discovered, however, that not only is the effect of the presence of such antioxidants and carbon black in the polymer not additive, but that the effectiveness of the antioxidant in the presence of carbon black is reduced several fold, and in many instances is rendered completely ineffectual in that such a product has no more resistance against thermal oxidative degradation than does a sample containing no thermal antioxidant whatever.

In accordance with the disclosure herein, we have discovered a class of materials which, when combined with carbon black in polymeric materials such as polyethylene, results in a stabilized product which compares favorably with polymeric materials in which have been incorporated the most effective commercially available antioxidants and which contain no carbon black. These materials which are for the most part completely ineffectual in the absence of carbon black appear to owe their effectiveness to a different mechanism than that of the commercially available antioxidants.

The retarder materials of this invention are all aliphatic mercaptans falling within the general formula R—(SH)$_x$ in which R is an aliphatic radical containing from 6 to 30 carbon atoms including substituents and $x$ is an integer having a maximum value of two. The aliphatic radical R may contain any number of hydrocarbon substituents providing the total number of carbon atoms falls within the range set forth above and may additionally contain other substituents known to be inert with respect to the polymeric material into which the retarder is to be introduced. Such inert substituents include halogen, azo, nitro, ether, ester, acyl and similar groups. Examples of aliphatic mercaptans which are effectively used as retarders in combination with carbon black and polymeric materials of the class set forth include:

Dodecyl mercaptan
1,10 decamethylenedithiol
Hexyl mercaptan
Heptyl mercaptan
Octyl mercaptan
Nonyl mercaptan
Decyl mercaptan
Undecyl mercaptan
Pentadecyl mercaptan
Cosyl mercaptan
1,6 hexamethylenedithiol
1,8 octamethylenedithiol
1,14 tetradecamethylenedithiol
1,20 dimercaptocosane
2-chloro-1 mercaptohexane As will be recognized by those skilled in the art, the retarder class of this invention represents a departure from conventional antioxidant chemistry. Heretofore, all common commercially available antioxidants for use both in this class of polymeric materials and in other classes such as the unsaturants contained at least one cyclic nucleus, usually aromatic, and contained in addition both an active ring substituent such as a secondary amine or hydroxyl radical and often a second substituent designed to sterically hinder the antioxidant so as to present the active group from being oxidized too rapidly and to assure a reasonable protective life. The retarder materials of this invention on the other hand, do not contain aromatic or other cyclic nucleus and do not depend upon the presence of active antioxidant groupings with or without steric hindrance groupings for their effectiveness. In addition, whereas most commercially available antioxidants, when incorporated into polymers of the class herein set forth, result in a stabilized product only in the absence of carbon black and lose most or all of their effectiveness in the presence of dispersed carbon black, the retarders of this invention depend for their effectiveness on the presence of carbon particles and impart little or no protection to polymers not containing this light shielding material.

The advantages gained by use of compositions of this invention will be appreciated by reference to the figures of the accompanying drawing which on coordinates of oxygen uptake against time are plotted from data taken from accelerated tests indicating the amount of oxygen absorbed by samples of polyethylene containing two of the retarders of this invention both with and without carbon black.

Figure 2:
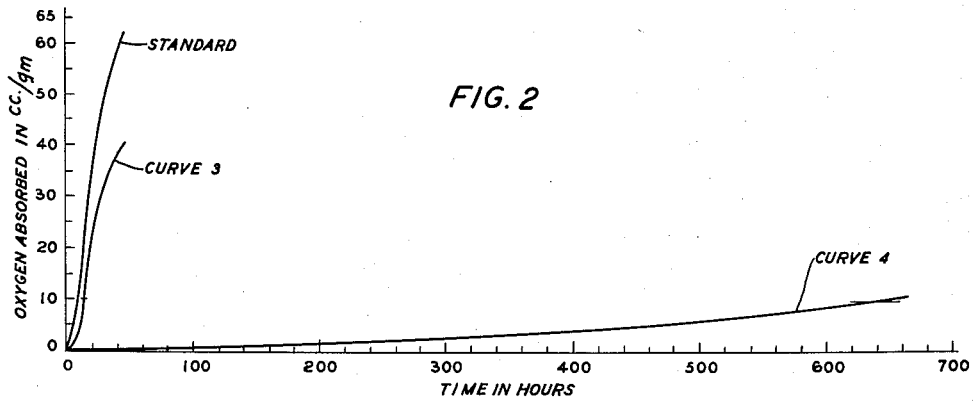

Fig. 1 contains two curves on these coordinates representative of two samples of polyethylene both containing dodecyl mercaptan, one sample additionally containing dispersed carbon black particles and a third curve correspnoding with a sample of polyethylene containing no additives; and Fig. 2 contains three such curves for samples of polyethylene, one containing no additives and the other two containing 1,10 decamethylenedithiol, one sample additionally containing carbon black particles.

The figures presented are representative of data taken from a standard accelerated aging test for polymeric materials. Such tests are well known and data taken therefrom is of known significance. To aid in an understanding of the figures, an outline of the accelerated testing procedure used is set forth below:

*Accelerated test procedure*

The saturated hydrocarbon polymer containing tertiary hydrogen atoms, which in all of the tests for which data is reported on the accompanying figure was polyethylene, together with a retarder as reported herein and carbon black where required was prepared by mill-massing on a 6-inch by 12-inch two-roll mill having roll speeds of approximately 25 and 35 r.m.p. with the rolls at a temperature of about 120° C. The polyethylene used in these studies was a commercial, high-molecular weight, high-pressure polymer supplied by the Bakelite Company as DYNK. This particular polymeric product finds widespread use in industry in such applications as cable sheathing and primary conductor insulation. Where carbon black was to be included, a master batch of polyethylene and 25 percent by weight of carbon black was first prepared by milling, after which the concentration of carbon black was cut back to about 3 percent by dilution with additional polyethylene. This procedure was followed to insure good dispersion of the carbon black throughout the polymer. In instances where the melting point of the retarder under study was above 255° F., the master batch also contained an amount of such retarder in excess of the amount to be tested. In such instances, the excess of retarder was proportionally equal to the excess of carbon black so that the amounts of both additives could be reduced to the desired levels by the addition of polyethylene. Where the melting point of the retarder was below 255° F., it was added directly in the final concentration to the diluted mix which already contained the desired amount of carbon black, special care being taken to avoid loss of retarder by evaporation.

Test sheets of the polymeric material containing both the retarder and the carbon black were molded to a thickness of approximately 50 mils, and 14-millimeter diameter disks were cut from these sheets. Four such discs, each in a shallow glass cup, were placed in a Pyrex glass tube attached to a mercury manometer together with about 2 grams of powdered barium oxide or similar absorbent. The reaction vessel, after being successively evacuated and filled with oxygen to assure a complete oxygen environment, was again filled with oxygen and was placed in an air-circulating strip-heater oven maintained at 140° C. and of such design as to assure a variation of no more than 1° C. throughout the entire volume in the oven. The reaction vessel was immediately connected to an oxygen gas burette with a short length of polyvinyl chloride tubing. After reaching temperature equilibrium at the said temperature of about 140° C. which took about 15 minutes, the system was adjusted to zero reading at atmospheric pressure. Readings of oxygen uptake were made as required at atmospheric pressure, one such reading being taken every 4 to 12 hours.

In discussing the figures, reference will be made to an absorption of 10 cubic centimeters of oxygen per gram of polymeric sample. This amount, which is approximately equal to an absorption of oxygen of 0.5 percent by weight, is here assumed to be a measure of the maximum permissive extent of oxidation beyond which the physical and electrical characteristics of the polymer are appreciably affected.

Referring again to Fig. 1, there are presented three curves on coordinates of oxygen absorbed in cubic centimeters per gram of polymer and time in hours. The first of these, designated "standard," corresponds with a polyethylene sample containing no additives. It is seen that this control sample oxidized rapidly and had absorbed 10 cubic centimeters of oxygen after about eight hours of exposure at 140° C. Similar exposure of a polyethylene sample containing 0.1 percent of dodecyl mercaptan resulted in the data plotted as curve 1. Curve 1 is not significantly different from the "standard" and it is concluded that no protection was afforded the polymer by the dodecyl mercaptan alone.

The sample corersponding to curve 2 contained 3 percent by weight of dispersed carbon black particles in addition to the 0.1 percent of dodecyl mercaptan. It is seen that this combination resulted in a composition which had absorbed 10 cubic centimeters of oxygen only after about 159 hours, an absorption rate comparing favorably with clear polyethylene samples containing the best commercially available secondary amine-type antioxidants.

Similar curves are presented in Fig. 2 for 1,10 decamethylenedithiol. The coordinates are the same as those of Fig. 1. In this figure the curve designated "standard" again corresponds with the control sample of polyethylene containing no additives. Incorporation into the polymer of 0.1 percent of 1,10 decamethylenedithiol and exposure under the outlined test conditions resulted in an absorption curve (curve 3) closely resembling that of the control sample ("standard" curve). However, curve 4, plotted from test data for a polyethylene sample containing 0.1 percent of 1,10 decamethylenedithiol and also 3 percent of carbon black particles shows a substantial improvement in stabilization against oxidation. This latter sample, in absorbing 10 cubic centimeters of oxygen only after about 650 hours, has withstood thermal oxidative degradation appreciably better than samples containing any of the commercial antioxidants.

It will be noted that there is a distinct difference in form between curve 4 of Fig. 2 and the type of curve which generally results on plotting data taken from such tests run on polymeric samples containing the common commercial antioxidants. In tests run on conventional antioxidants in such polymeric samples there generally results a distinct transition point separating two regions having different oxidation rates. The first portion of a curve plotted from such data from the origin to the transition point is interpreted as indicating that period over which the antioxidant is protecting the polymer and that portion beyond the transition point is considered to represent the period during which oxidation of the polymer proceeds unhampered due to previous exhaustion of the antioxidant. In contrast curve 4 of Fig. 2 manifests substantially constant slope for a period of about 400 hours and although there is a change in slope after this period, the oxidation rate for the second portion of the curve has too gentle a slope to manifest unhampered oxidation of the polymer. That portion of curve 2 of Fig. 1 up to 130 hours is of about the same slope as the corresponding portion of curve 4 of Fig. 2 and although there is a sharp upturn after this point dilution tests and other tests made on retarder materials of this class would appear to indicate that the subsequent portion of curve 2 is not characteristic of the retarder but, rather, is indicative of incomplete dispersion of the retarder and/or carbon black in the polymer.

The form of curve 4 of Fig. 2 and the first portion of curve 2 of Fig. 1 is considered to be more nearly characteristic of that group of antioxidants known as retarders. Such materials in combination with a polymer such as polyethylene effect a change in its characteristic oxidation mechanism. Whereas in the absence of a retarder, oxidation of any part of the polymeric molecule produces a chain reaction with a consequent rapid breakdown of the polymer, the presence of a retarder results in oxidation of the polymer in such manner that an autocatalytic chain reaction is not brought about. Under these circumstances oxidation, although it proceeds does so at a slower rate thereby resulting in characteristic curves such as curve 4 of Fig. 2 and the first portion of curve 2 of Fig. 1. Furthermore, the fact that these curves do not show a break over so long a period as 400 and 130 hours the retarder present should have reacted at least once of accelerated test, during which times a large portion of with the oxygenated radicals, indicates that the reaction might be such as to cause regeneration of the retarder.

A postulated reaction which would explain the above results and which is consistent with known reactions follows:

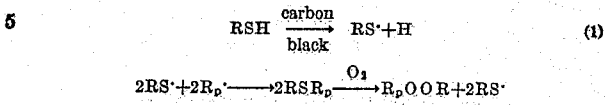

in which $R_p \cdot$ represents the oxygenated polymeric radical. This equation is intended as a general explanation of the reaction which occurs in any essentially saturated polymer containing tertiary hydrogen atoms such, for example, as polyethylene containing one of the retarders of this invention in combination with carbon black. As has been set forth above, the symbol R represents any aliphatic radical with or without hydrocarbon substituents and/or other substituents which are inert with respect to the polymer and containing from 6 to 30 carbon atoms including substituents.

As the equation indicates breakdown of the retarder in the presence of carbon black results in the formation of the aliphatic sulfide radical which then retards oxidation of the polymeric chain to produce the $RSR_p$ structure which is in turn oxidized to regenerate the aliphatic sulfide radical together with the $R_pOOR_p$ type of structure. Apparently, this $R_pOOR_p$ compound is fairly stable and does not result in the initiation of a chain reaction such as is normally produced in the polymeric materials here under consideration in the presence of oxygen.

Why the reaction set forth above does not occur in clear polyethylene is not known, although it is postulated that the $RS \cdot$ radical is produced only under the catalytic influence of carbon black. It should be especially noted that the equation above is offered only as a possible explanation of the retarder action in view of the known results and dependence is in no way had upon it either as a basis for the specification or as substantiation for the claims herein.

As is amply set forth herein, although the invention has been expressed primarily in terms of specific retarders and a specific amount of carbon black in a specific polymer, a person skilled in the art will recognize that the principles expressed herein are equally applicable to the other retarders and polymers and to the ranges of composition all of which have been set forth.

As has been stated, the type of polymeric breakdown against which stabilization is had by use of the retarders herein in combination with carbon black is dependent upon the presence of tertiary hydrogen atoms in the polymer. As is known such tertiary hydrogen atoms occur in random fashion in polyethylene and also occur in predictable fashion at determinate intervals in the chain of polymerized products of the higher homologues of ethylene such, for example, as polypropylene. Tertiary hydrogen atoms do not occur in such polymeric products as polyisobutylene and although there is a theoretical possibility that one such atom may occur at the terminus of such a chain, such materials are not effectively stabilized by the retarders of this invention. Although commercially available polymeric materials falling within the designated class stabilized by the retarders of this invention are for the most part polymerized products of monomers containing four or fewer carbon atoms, use of the retarders herein together with carbon black afford equal protection to higher order polymers such, for example, as polyhexene.

What is claimed is:

1. A composition which is stabilized against oxidation comprising from 0.5 percent to 5 percent by weight of carbon black particles of maximum size of 1000 Angstroms, from .01 percent to 5 percent of a compound of the structure $R-(SH)_x$ in which R is an alkyl radical containing from 6 to 30 carbon atoms and $x$ is an integer having a maximum value of two, and an essentially saturated hydrocarbon polymeric material selected from the group consisting of polymers of ethylene, propylene, butene-1, 3-methyl pentene-1, dodecene-1, 4,4-dimethyl pentene-1, 3-methyl butene-1, 4-methyl pentene-1 and mixtures of any of these materials, and in which all weight percents are based on the said composition.

2. The composition of claim 1 in which the polymeric material is a homopolymer.

3. The composition of claim 1 in which the polymeric material is a copolymer.

4. The composition of claim 1 in which the compound is dodecyl mercaptan.

5. The composition of claim 1 in which the compound is 1,10-decamethylenedithiol.

6. The composition of claim 1 in which the compound is dodecyl mercaptan and the polymeric material is polyethylene.

7. The composition of claim 1 in which the compound is 1,10-decamethylenedithiol and the polymeric material is polyethylene.

References Cited in the file of this patent

UNITED STATES PATENTS

| | | |
|---|---|---|
| 2,431,303 | Billmeyer | Nov. 25, 1949 |
| 2,481,596 | Irany et al. | Sept. 13, 1949 |
| 2,512,459 | Hamilton | June 20, 1950 |
| 2,769,784 | Young | Nov. 6, 1956 |
| 2,843,577 | Friedlander et al. | July 15, 1958 |

OTHER REFERENCES

Raff: "Polyethylene," 1956, page 103, Interscience Publishers Inc.

Marchionna: "Butalastic Polymers," 1946, page 401, Reinhold Publishing Corp.